US012170427B2

(12) United States Patent
Huang et al.

(10) Patent No.: US 12,170,427 B2
(45) Date of Patent: Dec. 17, 2024

(54) INTERNAL PRINTED CIRCUIT BOARD-TO-PRINTED CIRCUIT BOARD CONNECTOR FOR WIRELESS COMMUNICATION DEVICE

(71) Applicant: Outdoor Wireless Networks LLC, Claremont, NC (US)

(72) Inventors: MuLan Huang, Jiangsu (CN); Yujun Zhang, Jiangsu (CN); Yuanyao Zhou, Jiangsu (CN); Li Zhang, Jiangsu (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 171 days.

(21) Appl. No.: 17/573,993

(22) Filed: Jan. 12, 2022

(65) Prior Publication Data

US 2022/0247137 A1 Aug. 4, 2022

(30) Foreign Application Priority Data

Feb. 2, 2021 (CN) ......................... 202120293104.1

(51) Int. Cl.
*H01R 9/05* (2006.01)
*H01R 24/50* (2011.01)
*H01Q 1/24* (2006.01)

(52) U.S. Cl.
CPC ............. *H01R 24/50* (2013.01); *H01Q 1/246* (2013.01)

(58) Field of Classification Search
CPC ......... H01R 24/50; H01R 12/91; H01Q 1/246
See application file for complete search history.

(56) References Cited

U.S. PATENT DOCUMENTS 3,879,103 A 4/1975 Peltola et al.
3,910,665 A * 10/1975 Stull ...................... H01R 24/50
439/63

(Continued)

FOREIGN PATENT DOCUMENTS

EP 0189846 A2 8/1986
JP 2011040201 A 2/2011

OTHER PUBLICATIONS

"International Preliminary Report on Patentability corresponding to International Application No. PCT/US2022/012076 issued Aug. 17, 2023".

(Continued)

*Primary Examiner* — Abdullah A Riyami
*Assistant Examiner* — Nelson R. Burgos-Guntin
(74) *Attorney, Agent, or Firm* — Myers Bigel, P.A.

(57) ABSTRACT

A board-to-board connector for wireless communication devices connects first and second circuit boards. The circuit board connector includes: a radio frequency coaxial cable; and a first interface and a second interface respectively connected to two opposing ends of the radio frequency coaxial cable, wherein each of the first interface and the second interface includes a housing, the housing includes a hollow main body part and a flange part located at a first end of the main body part, the main body part receives one end of the radio frequency coaxial cable at a second end opposite to the first end, the flange part is provided with one or more protruding portions, a protruding portion of the first interface is configured to connect the first interface to the first circuit board, and a protruding portion of the second interface is configured to connect the second interface to the second circuit board.

19 Claims, 7 Drawing Sheets

(56) References Cited

U.S. PATENT DOCUMENTS

| | | | | |
|---|---|---|---|---|
| 6,948,977 | B1 * | 9/2005 | Behrent | H01R 13/659 439/607.01 |
| 7,018,216 | B1 * | 3/2006 | Clark | H01R 13/6592 439/63 |
| 10,396,510 | B1 * | 8/2019 | Wagner | H01R 24/50 |
| 10,516,224 | B1 * | 12/2019 | Taylor | H05K 3/366 |
| 2004/0106304 | A1 | 6/2004 | Lin et al. | |
| 2007/0184681 | A1 * | 8/2007 | Tutt | H01R 13/6586 439/67 |
| 2008/0268705 | A1 * | 10/2008 | Yamane | H01R 4/028 439/578 |
| 2010/0144186 | A1 | 6/2010 | Gibbs et al. | |
| 2010/0304579 | A1 * | 12/2010 | Kisling | H01R 9/0515 439/63 |
| 2011/0028033 | A1 * | 2/2011 | Sato | H01R 24/50 439/578 |
| 2011/0183544 | A1 * | 7/2011 | Esplin | H01R 9/0515 439/581 |
| 2013/0109228 | A1 * | 5/2013 | Sykes | H01R 9/0515 439/578 |
| 2013/0171876 | A1 * | 7/2013 | Funahashi | H01R 24/50 439/620.03 |
| 2014/0030915 | A1 * | 1/2014 | Perrin | H01R 24/50 439/578 |
| 2014/0273550 | A1 * | 9/2014 | Biddle | H01R 12/7005 439/63 |
| 2014/0273648 | A1 * | 9/2014 | Baumler | H01R 31/06 439/638 |
| 2015/0118904 | A1 * | 4/2015 | Baechle | H01R 12/91 439/591 |
| 2017/0365923 | A1 * | 12/2017 | Schmutzler | H01P 1/184 |
| 2018/0076583 | A1 * | 3/2018 | Yi | H01R 25/003 |
| 2018/0366844 | A1 * | 12/2018 | Beganovic | H01R 24/50 |
| 2020/0091636 | A1 * | 3/2020 | Gruber | H01R 24/40 |
| 2020/0136314 | A1 * | 4/2020 | Kim | H01R 13/6315 |
| 2020/0203902 | A1 * | 6/2020 | Wang | H01R 13/631 |

OTHER PUBLICATIONS

"International Search Report and Written Opinion corresponding to International Application No. PCT/US2022/012076 mailed May 4, 2022".

* cited by examiner

INTERNAL PRINTED CIRCUIT BOARD-TO-PRINTED CIRCUIT BOARD CONNECTOR FOR WIRELESS COMMUNICATION DEVICE

RELATED APPLICATION

The present application claims priority from and the benefit of Chinese Utility Model Application No. 202120293104.1, filed Feb. 2, 2021, the disclosure of which is hereby incorporated herein by reference in full.

FIELD OF THE INVENTION

The present disclosure relates to the field of wireless communications in general. More specifically, the present disclosure relates to an internal printed circuit board-to-printed circuit board connector for a wireless communication device.

BACKGROUND OF THE INVENTION

Wireless communication devices can be mounted on the top of a communication tower, and usually have printed circuit boards inside. In some embodiments, two printed circuit boards are connected together by a radio frequency coaxial cable. For example, in the connection between a reflector of an antenna and a calibration plate of the antenna, an inner conductor and an outer conductor of an end of the radio frequency coaxial cable are respectively soldered to the surface of each printed circuit board. However, the soldering between the outer conductor of the radio frequency coaxial cable and the printed circuit board can easily loosen, resulting in poor Passive Inter-Modulation (PIM) performance.

In other applications, a board-to-board connector may also be used to connect two printed circuit boards together. The board-to-board connector extends between the two printed circuit boards and connects to additional connectors on the two printed circuit boards at both ends. This kind of connector typically has a complex structure and high cost, and the PIM performance may also be unsatisfactory.

SUMMARY OF THE INVENTION

The present disclosure provides an internal printed circuit board-to-printed circuit board connector for wireless communication devices that can overcome at least one of the aforementioned defects in existing products.

One aspect of the present disclosure relates to n internal printed circuit board-to-printed circuit board connector for a wireless communication base station, wherein the internal printed circuit board-to-printed circuit board connector is configured to connect a first circuit board and a second circuit board spaced apart together, the internal printed circuit board-to-printed circuit board connector includes:

a radio frequency coaxial cable; and a first interface and a second interface respectively connected to two opposing ends of the radio frequency coaxial cable, wherein each of the first interface and the second interface includes a housing, the housing includes a hollow main body part and a flange part located at a first end of the main body part, the main body part receives one end of the radio frequency coaxial cable at a second end opposite to the first end, the flange part is provided with one or more protruding portions, a protruding portion of the first interface is configured to connect the first interface to the first circuit board, and a protruding portion of the second interface is configured to connect the second interface to the second circuit board.

In some embodiments, each of the two opposing ends of the radio frequency coaxial cable is provided with an exposed inner conductor section, an exposed insulating layer section, and an exposed outer conductor section in this sequence from the end, or is provided with an exposed inner conductor section and an exposed outer conductor section in this sequence from the end.

In some embodiments, at least two continuous axial through holes are provided in the hollow interior of the main body part of the housing, the at least two continuous axial holes include a first axial through hole close to the first end of the main body part and a second axial through hole close to the second end of the main body part, and the first axial through hole has a diameter smaller than that of the second axial through hole.

In some embodiments, the second axial through hole is configured to receive the exposed outer conductor section of the radio frequency coaxial cable, and has a diameter greater than the diameter of the exposed outer conductor section of the radio frequency coaxial cable.

In some embodiments, the second axial through hole is configured to receive solder around the exposed outer conductor section of the radio frequency coaxial cable so as to solder the exposed outer conductor section of the radio frequency coaxial cable to the main body part.

In some embodiments, the flange part protrudes radially outward from the first end of the main body part.

In some embodiments, the flange part surrounds the first end of the main body part in a continuous ring shape, or surrounds the first end of the main body part in a plurality of arc shapes spaced apart from one another.

In some embodiments, the one or more protruding portions include an elongated leg protruding outward in an axial direction from an axial outer surface of the flange part.

In some embodiments, the leg is configured to pass through the through hole on the first circuit board or the second circuit board so as to be fixed to the corresponding circuit board by soldering.

In some embodiments, the one or more protruding portions include a protrusion protruding outward in the axial direction from the axial outer surface of the flange part.

In some embodiments, the protrusion is configured to be fixed to the first circuit board or the second circuit board by soldering.

In some embodiment, the main body part is a substantially elongated hollow cylinder.

In some embodiments, the first axial through hole is configured to fix the exposed insulating layer section of the radio frequency coaxial cable, and has a diameter equal to or slightly greater than the diameter of the exposed insulating layer section of the radio frequency coaxial cable and smaller than the diameter of the exposed outer conductor section of the radio frequency coaxial cable.

In some embodiments, the exposed inner conductor section of the radio frequency coaxial cable protrudes to the outside of the hollow interior of the main body part until it is substantially flush with the protruding portion or exceeds the protruding portion in the axial direction.

In some embodiments, the interface further includes an inner contact portion provided in the hollow interior of the main body part, a first end of the inner contact portion protrudes out of the first end of the inner interior of the main body part until it is substantially flush with the protruding portion or exceeds the protruding portion in the axial direction, and an opposite second end of the inner contact portion is provided with a concave portion for receiving the exposed inner conductor section of the radio frequency coaxial cable.

In some embodiments, the inner contact portion is substantially provided on a central axis of the housing.

In some embodiments, the inner contact portion and the housing are spaced apart and are insulated by air.

In some embodiments, the interface further includes an insulating layer, and the insulating layer of the interface surrounds and fixes the inner contact portion and is provided between the inner contact portion and the housing.

In some embodiments, the first axial through hole is configured to fix the insulating layer of the interface, and the diameter of the first axial through hole is smaller than the diameter of the exposed outer conductor section of the radio frequency coaxial cable.

Other features and advantages of the subject technology of the present disclosure will be set forth in the description below, and in part will be apparent from the description, or may be learned by practice of the subject technology of the present disclosure. The advantages of the subject technology of the present disclosure will be realized and attained by the structure particularly pointed out in the written Specification and Claims hereof as well as the attached drawings.

It should be understood that both the foregoing general description and the following detailed description are exemplary and explanatory and are intended to provide further explanation of the subject technology of the present disclosure as claimed.

BRIEF DESCRIPTION OF THE DRAWINGS

A plurality of aspects of the present disclosure will be better understood after reading the following specific embodiments with reference to the attached drawings. Among the attached drawings.

EMBODIMENTS OF THE INVENTION

Figure 1A:
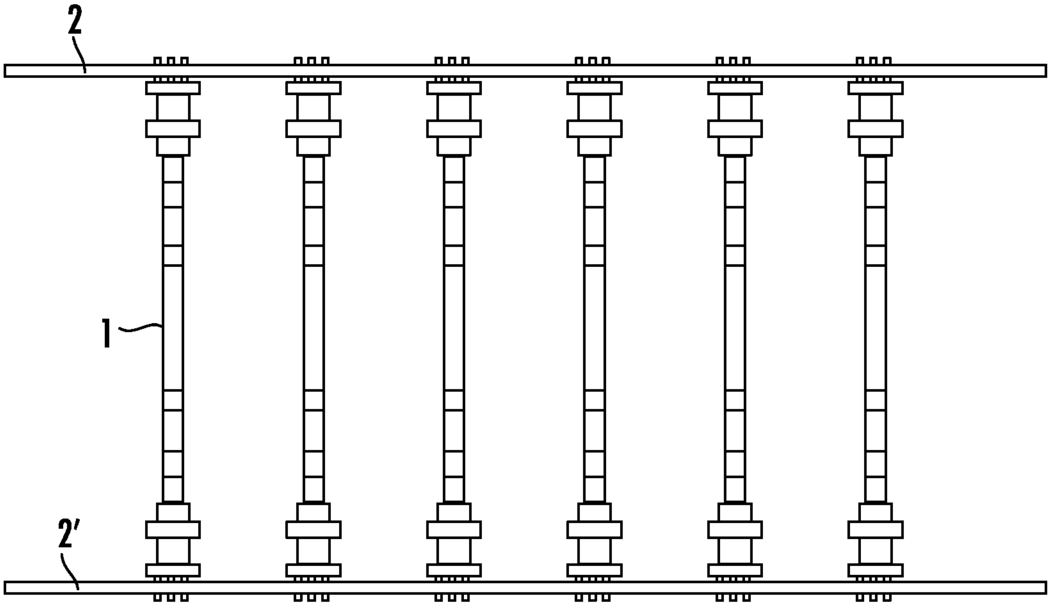
FIGS. 1A and 1B show schematic diagrams of a use environment of a board-to-board connector according to a first embodiment of the present disclosure.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those skilled in the art. It should also be understood that the embodiments disclosed in the present disclosure may be combined in various ways so as to provide more additional embodiments.

It should be understood that in all the attached drawings, the same symbols denote the same elements. In the attached drawings, the dimensions of certain features can be changed for clarity.

It should be understood that the words in the Specification are only used to describe specific embodiments and are not intended to limit the present disclosure. Unless otherwise defined, all terms (including technical terms and scientific terms) used in the Specification have the meanings commonly understood by those of ordinary skill in the art. For brevity and/or clarity, well-known functions or structures may not be further described in detail.

The singular forms “a”, “an”, “the” and “this” used in the Specification all include plural forms unless clearly indicated. The words “comprise”, “contain” and “have” used in the Specification indicate the presence of the claimed features, but do not exclude the presence of one or more other features. The word “and/or” used in the Specification includes any or all combinations of one or a plurality of the related listed items. The words “between X and Y” and “between approximate X and Y” used in the Specification shall be interpreted as including X and Y. The words “between approximate X and Y” and “from approximate X to Y” used in the Specification means “between approximate X and approximate Y” and “from approximate X to approximate Y”, respectively.

In the Specification, when it is described that an element is “on” another element, “attached” to another element, “connected” to another element, “coupled” to another element, or “in contact with” another element, etc., the element may be directly on another element, attached to another element, connected to another element, coupled to another element, or in contact with another element, or an intermediate element may be present. In contrast, if an element is described “directly” “on” another element, “directly attached” to another element, “directly connected” to another element, “directly coupled” to another element or “directly contacting” another element, there will be no intermediate elements. In the Specification, a feature that is arranged “adjacent” to another feature, may denote that a feature has a part that overlaps an adjacent feature or a part located above or below the adjacent feature.

In the Specification, words expressing spatial relations such as “upper”, “lower”, “left”. “right”, “front”, “rear”, “top”, and “bottom” may describe the relation between one feature and another feature in the attached drawings. It should be understood that, in addition to the locations shown in the attached drawings, the words expressing spatial relations further include different locations of a device in use or operation. For example, when a device in the attached drawings rotates reversely, the features originally described as being “below” other features now can be described as being “above” the other features. The device may also be oriented by other means (rotated by 90 degrees or at other locations), and at this time, a relative spatial relation will be explained accordingly.

Figure 1B:
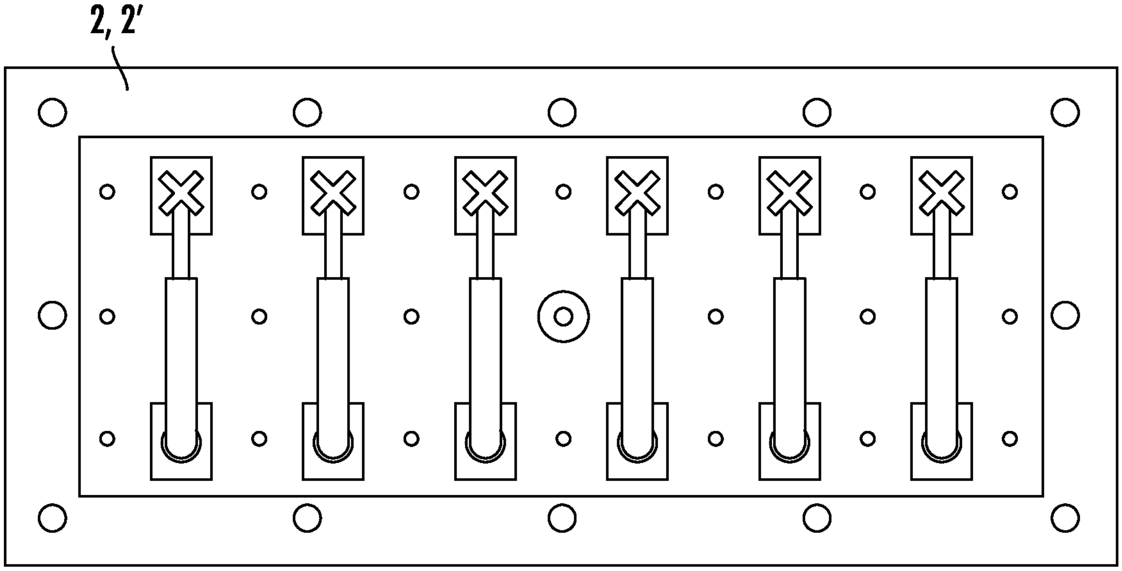

FIGS. 1A and 1B show schematic diagrams of use of an internal printed circuit board-to-printed circuit board connector (hereinafter referred to as “board-to-board connector”) 1 according to a first embodiment of the present disclosure. As shown in the figures, the board-to-board connector 1 is placed between two circuit boards 2 and 2' which are substantially parallel and spaced apart, and two ends are respectively connected to the circuit boards 2 and 2'. The circuit board 2 may be mounted on a reflector of an antenna, for example, and the circuit board 2' may be mounted on a calibration plate of the antenna, for example. The circuit boards 2 and 2' may have a conventional structure, and may include electronic traces and electronic components which transmit electrical signals.

Figure 2A:
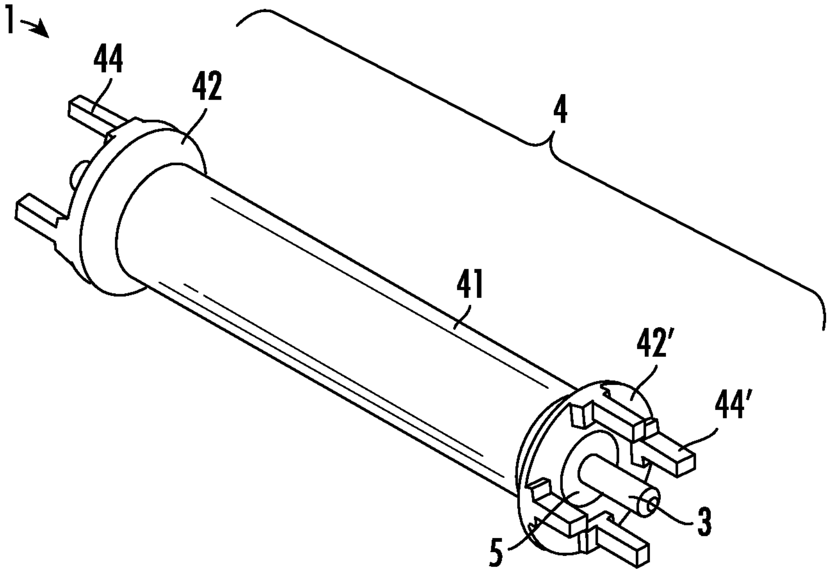
FIGS. 2A and 2B respectively show a perspective view and a cross-sectional view of the board-to-board connector in FIG. 1.
Figure 2B:
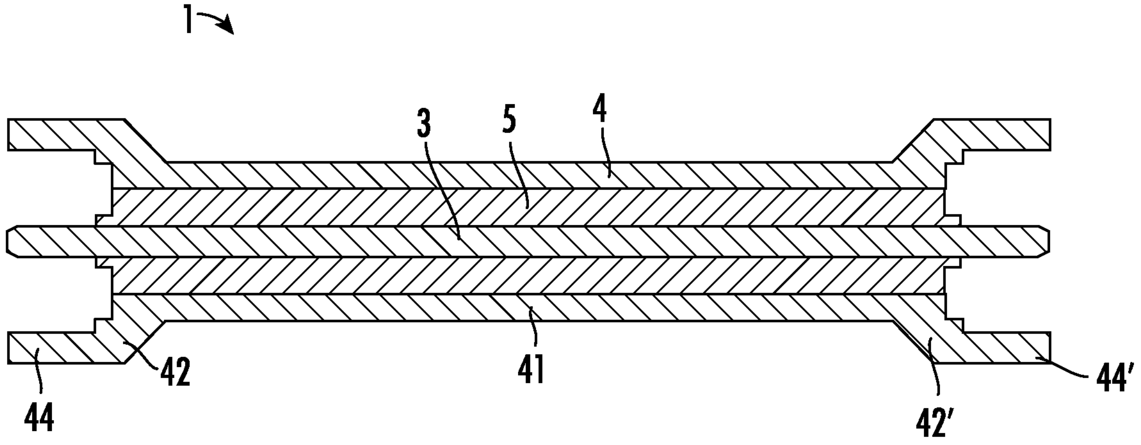

FIGS. 2A and 2B show a perspective view and a cross-sectional view of the board-to-board connector 1. As shown in the figures, the board-to-board connector 1 is a substantially elongated cylinder and is used to electrically connect the two spaced-apart circuit boards 2 and 2' together. The board-to-board connector 1 includes an inner contact portion 3, a housing 4, and an insulating layer 5 provided between the inner contact portion 3 and the housing 4. The inner contact portion 3 is used to transmit electrical signals between the two circuit boards 2 and 2', the housing 4 is used to ground the board-to-board connector 1 and shield radio frequency signals, and the insulating layer 5 is used to insulate and separate the conductive inner contact portion 3 and the conductive housing 4. The inner contact portion 3 and the housing 4 may be made of any suitable metal material with good electrical conductivity, and the insulating layer 5 may be made of a non-metal material with good insulating performance and stable dielectric constant property.

The housing 4 includes, in an axial direction, a main body part 41 and flange parts 42 and 42' located at both ends of the main body part 41. The main body part 41 is a substantially elongated hollow cylinder, and the insulating layer 5 and the inner contact portion 3 are received in the hollow interior of the cylinder. The flange part 42 protrudes radially outward from one end of the main body part 41, and the flange part 42' protrudes radially outward from the other opposite end of the main body part 41. The flange parts 42 and 42' may surround the ends of the main body part 41 in a continuous ring shape, or surround the ends of the main body part 41 in a plurality of arc shapes spaced apart from one another. In some embodiments, reinforcing members (for example, reinforcing ribs, etc.) may be provided at the junctions between the main body part 41 and the flange parts 42 and 42' to enhance the stability of the flange parts 42 and 42'.

One or more elongated legs 44 (with 4 shown in the figures) may be evenly or unevenly distributed on an axial outer surface of the flange part 42 in a circumferential direction, and protrude outward in the axial direction. The leg 44 is used to pass through a through hole on the circuit board 2 so as to be fixed to the circuit board 2 by soldering or the like. Similarly, one or more legs 44' (four shown in the figures) may be evenly or unevenly distributed on an axial outer surface of the flange part 42' in a circumferential direction, and protrude outward in the axial direction. The leg 44' is used to pass through a through hole on the circuit board 2 so as to be fixed to the circuit board 2' by soldering or the like.

Figure 3:
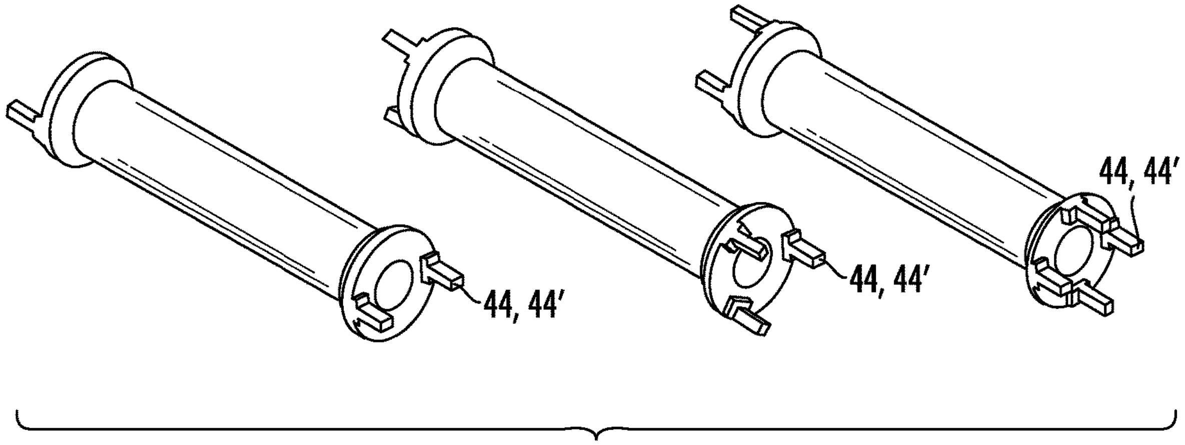
FIG. 3 shows other examples of embodiments of the board-to-board connector in FIG. 1.

In some embodiments, as shown in FIG. 3, the number of legs 44 and 44' may be set to 1, 2, 3, 4, 5, or any other suitable number. In some embodiments, the number of legs 44 and the number of legs 44' may be set to be the same, and may also be set to be different from each other.

Figure 4:
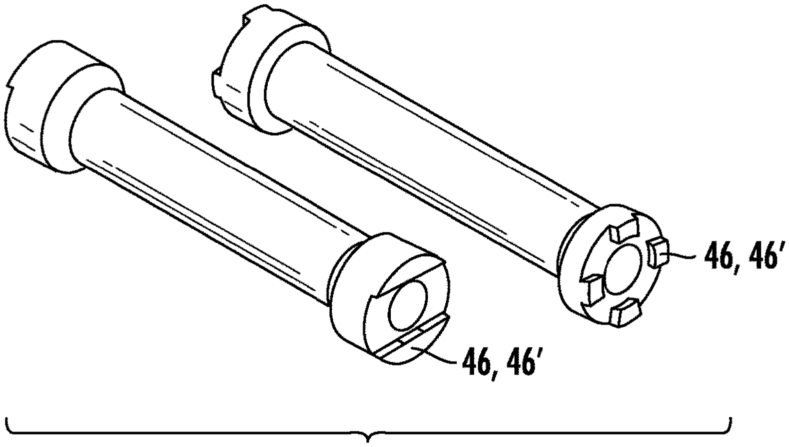
FIG. 4 shows additional examples of embodiments of the board-to-board connector in FIG. 1.

In another example, as shown in FIG. 4, instead of the legs 44 and 44', one or more protrusions 46 and 46' may be evenly or unevenly distributed on the axial outer surfaces of the flange parts 42 and 42' in the circumferential direction, and protrude outward in the axial direction. The protrusions 46 and 46' do not pass through the through holes on the circuit boards 2 and 2, but are directly fixed to the circuit boards 2 and 2' by soldering or the like.

In some embodiments, the number of protrusions 46 and 46' may be set to 1, 2, 3, 4, 5, or any other suitable number. In some embodiments, the number of protrusions 46 and the number of protrusions 46' may be set to be the same, and may also be set to be different from each other. In some embodiments, one of the flange parts 42 and 42' may be provided with a protrusion, while the other may be provided with a leg.

Returning to FIGS. 2A and 2B, the insulating layer 5 is provided in the hollow interior of the main body part 41 of the housing 4 and surrounds and fixes the inner contact portion 3, thereby insulating and spacing the housing 4 and the inner contact portion 3.

The inner contact portion 3 is a substantially elongated rod body, and the cross-section may be substantially circular, substantially elliptical, substantially square, or any other suitable shape. The inner contact portion 3 is substantially provided on a central axis of the housing 4, and both ends protrude out of the hollow interior of the main body part 41 of the housing 4. In some embodiments, both ends of the inner contact portion 3 may protrude out of the hollow interior of the main body part 41 until they are substantially flush with the legs 44 and 44' or the protrusions 46 and 46' or exceed the legs 44 and 44' or the protrusions 46 and 46' in the axial direction. One end of the inner contact portion 3 passes through the through hole on the circuit board 2 and is connected to (for example, by soldering) a surface of the circuit board 2, while the other opposite end passes through the through hole on the circuit board 2' and is connected to (for example, by soldering) a surface of the circuit board 2'.

The process of connecting the board-to-board connector 1 to the two spaced-apart circuit boards 2 and 2' will be described below. First, one end of the inner contact portion 3 of the board-to-board connector 1 and the leg 44 on the housing 4 are inserted into the corresponding multiple through holes on the circuit board 2. Then, the other end of the inner contact portion 3 of the board-to-board connector 1 and the leg 44' on the housing 4 are inserted into the corresponding multiple through holes on the circuit board 2'. Thereafter, both ends of the inner contact portion 3 and the legs 44 and 44' on the housing are fixed to the circuit boards 2 and 2' by soldering or the like, thereby completing the connection process.

Figure 5A:
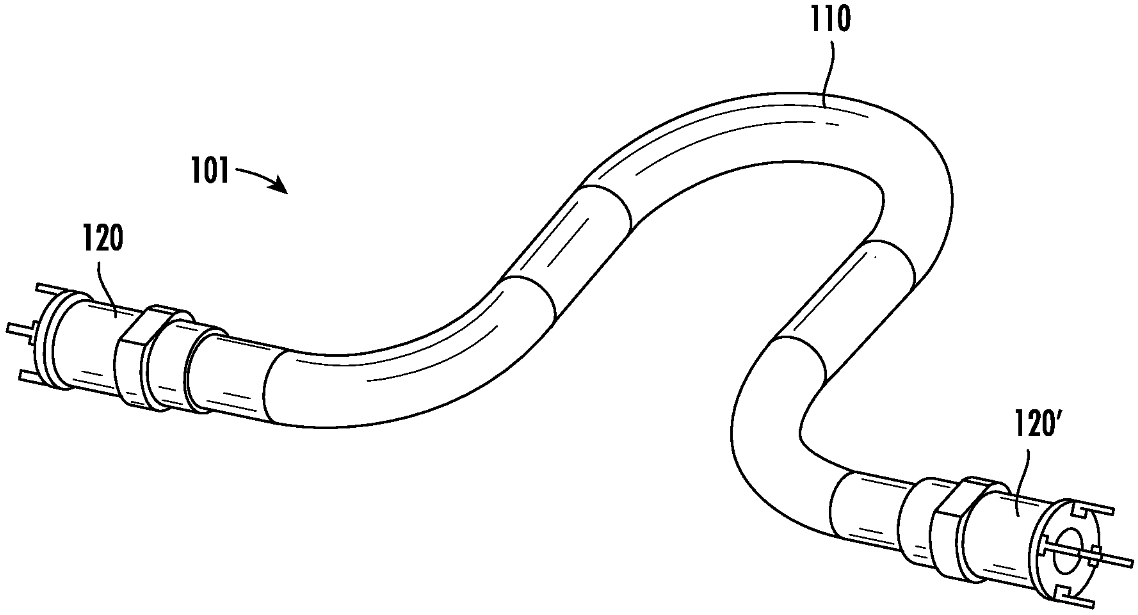
FIGS. 5A, 5B and 5C respectively show a perspective view, a schematic diagram of a use environment, and a partial cross-sectional view of a board-to-board connector according to a second overall embodiment of the present disclosure.
Figure 5B:
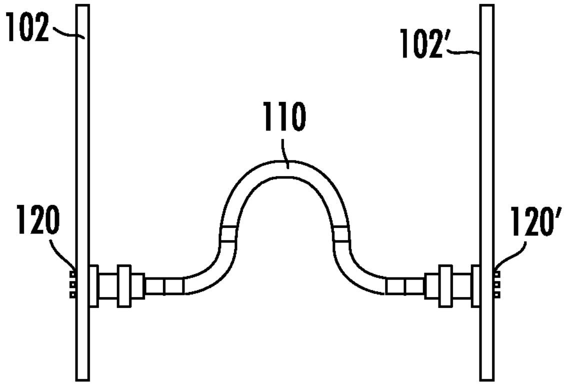
Figure 5C:
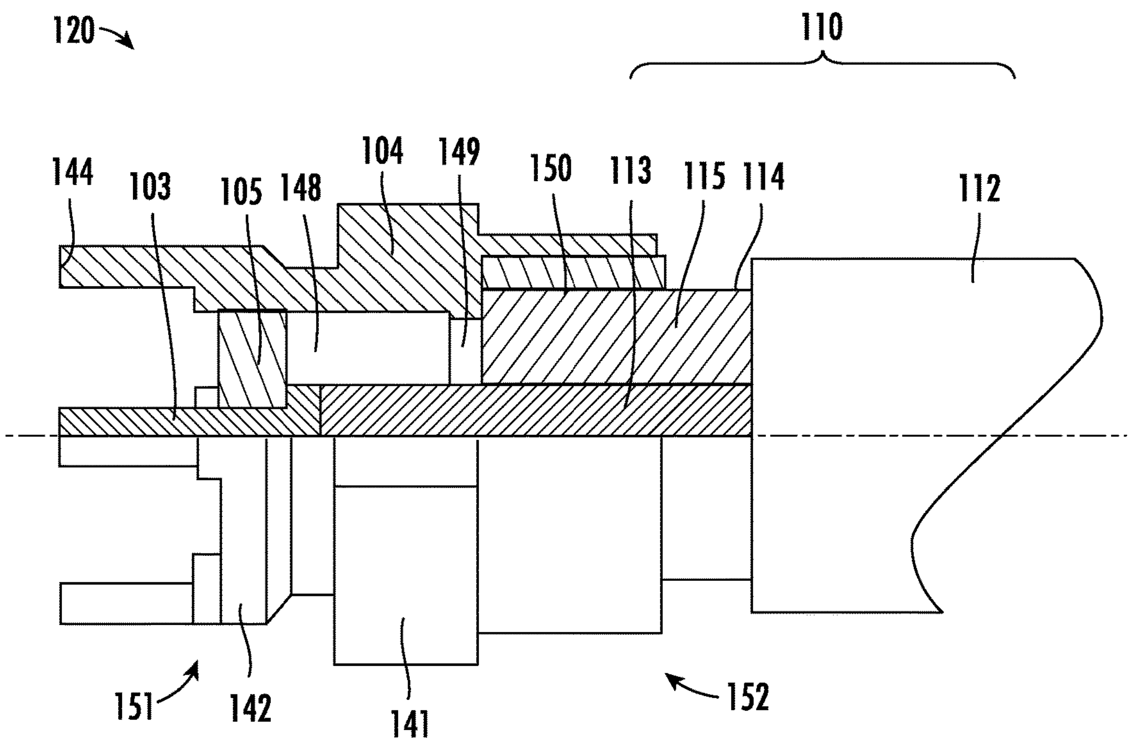

A board-to-board connector 101 according to a second embodiment of the present disclosure will be described below with reference to FIGS. 5A to 5C. The board-to-board connector 101 includes a flexible radio frequency coaxial cable 110, and interfaces 120 and 120' connected to two ends of the radio frequency coaxial cable 110. The radio frequency coaxial cable 110 includes an inner conductor 113, an insulating layer 115, an outer conductor 114, and a sheath 112 surrounding the outer conductor 114 radially from the inside to the outside. The interface 120 is used to connect one end of the radio frequency coaxial cable 110 to a circuit board 102, and the interface 120' is used to connect the other end of the radio frequency coaxial cable 110 to a circuit board 102'.

The interface 120 includes an inner contact portion 103, a housing 104, and an insulating layer 105 provided between the inner contact portion 103 and the housing 104. The inner contact portion 103 and the inner conductor 113 of the radio frequency coaxial cable 110 are together used to transmit electrical signals between the two circuit boards 102 and 102', the housing 104 and the outer conductor 114 of the radio frequency coaxial cable 110 are together used to ground the board-to-board connector 1 and shield radio frequency signals, and the insulating layer 105 is used to insulate and separate the conductive inner contact portion 103 and the conductive housing 104. The inner contact portion 103 and the housing 104 may be made of any suitable metal material with good electrical conductivity, and the insulating layer 105 may be made of a non-metal material with good insulating performance and stable dielectric constant property.

The housing 104 includes a main body part 141 and a flange part 142 located at a first end 151 of the main body part 141. The main body part 141 is a substantially elongated hollow cylinder. At least two continuous axial through holes (three shown in the figures, including through holes 148, 149, and 150) are provided in the radial interior of the hollow cylinder, and the diameter of the through hole 148 located near the first end 151 is smaller than the diameter of the through hole 150 located near the second end 152. The through hole 148 located near the first end 151 is used to fix the insulating layer 105 of the interface 120, and the insulating layer 105 fixes the inner contact portion 103 of the interface 120 in the hollow interior. The through hole 148 has a diameter smaller than the diameter of the outer conductor 114 of the radio frequency coaxial cable 110. The through hole 150 located near the second end 152 is used to receive the exposed outer conductor 114 of the radio frequency coaxial cable 110, and has a diameter greater than the diameter of the outer conductor 114 of the radio frequency coaxial cable 110.

The flange part 142 protrudes radially outward from the first end 151 of the main body part 141. The flange part 142 may surround the end of the main body part 141 in a continuous ring shape, or surround the end of the main body part 141 in a plurality of arc shapes spaced apart from one another. In some embodiments, a reinforcing member (for example, a reinforcing rib, etc.) may be provided at the junction between the flange part 142 and the main body part 141 to enhance the stability of the flange part 142.

One or more elongated legs 144 may be evenly or unevenly distributed on an axial outer surface of the flange part 142 in a circumferential direction, and protrude outward in the axial direction. The leg 144 is used to pass through a through hole on the circuit board 102 so as to be fixed to the circuit board 102 by soldering or the like. In some embodiments, the number of legs 144 may be set to 1, 2, 3, 4, 5, or any other suitable number.

In another example, instead of the leg 144, one or more protrusions may be evenly or unevenly distributed on the axial outer surfaces of the flange part 142 in the circumferential direction, and protrude outward in the axial direction. The protrusions do not pass through the through holes on the circuit boards 102, but are directly fixed to the circuit board 102 by soldering or the like. In some embodiments, the number of protrusions may be set to 1, 2, 3, 4, 5, or any other suitable number.

The insulating layer 105 is provided in the hollow interior of the main body part 141 of the housing 104 and surrounds and fixes the inner contact portion 103, thereby insulating and spacing the housing 104 and the inner contact portion 103.

The inner contact portion 103 is a substantially elongated rod body, and the cross-section may be substantially circular, substantially elliptical, substantially square, or any other suitable shape. The inner contact portion 103 is substantially provided on a central axis of the housing 104, and the first end protrudes out of the hollow interior of the main body part 141 of the housing 104. In some embodiments, the first end of the inner contact portion 103 may protrude out of the hollow interior of the main body part 141 until it is substantially flush with the leg 144 or the protrusion or exceeds the leg 144 or the protrusion in the axial direction. The first end of the inner contact portion 103 passes through the through hole on the circuit board 102 and is connected to (for example, by soldering) a surface of the circuit board 102. The opposite second end of the inner contact portion 103 has a concave portion for receiving the exposed inner conductor 113 of the radio frequency coaxial cable 110.

During assembly, a certain length of the sheath 112 at one end of the radio frequency coaxial cable 110 is stripped off to expose the outer conductor 114; a certain length of the exposed outer conductor 114 is stripped off to expose the insulating layer 115; and a certain overall length of the exposed insulating layer 115 is stripped off to expose the inner conductor 113. As a result, the end of the radio frequency coaxial cable 110 is provided with an exposed inner conductor 113 section, an exposed insulating layer 115 section (optionally), and an exposed outer conductor 114 section in this sequence from the end. The prepared end of the radio frequency coaxial cable 110 is inserted into the interface 120. The exposed inner conductor 113 section is inserted into the concave portion of the inner contact portion 103 of the interface 120, and the exposed outer conductor 114 section is placed in the through hole 150 of the main body 141. Solder 152 is placed in the through hole 150 and surrounds the outer conductor 114 of the radio frequency coaxial cable 110 so as to solder the outer conductor 114 of the radio frequency coaxial cable 110 to the main body part 141.

The interface 120' is used to connect the other end of the radio frequency coaxial cable 110 to the circuit board 102'. The interface 120' has a structure similar to that of the interface 120, and will not be described again.

Figure 5D:
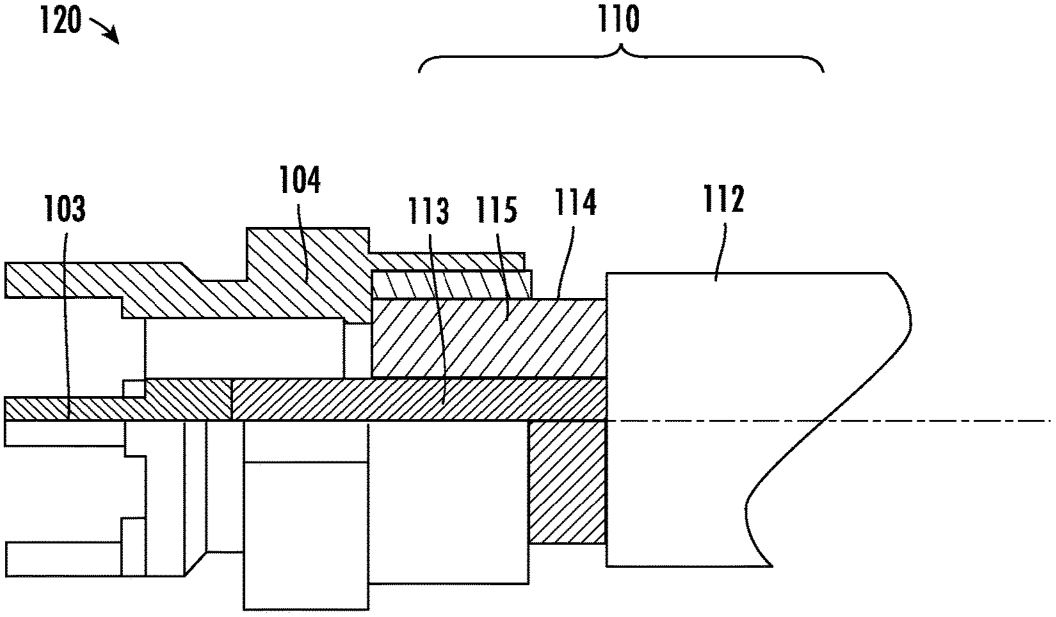
FIG. 5D shows a partial cross-sectional view of another exemplary embodiment of the board-to-board connector shown in FIG. 5C.

In some embodiments, as shown in FIG. 5D, the interface 120 may include the inner contact portion 103 and the housing 104 without including the insulating layer 105. Therefore, the inner contact portion 103 and the housing 104 are insulated by air. The inner contact portion 103 is directly received and fixed to the end of the exposed inner conductor 113 section of the radio frequency coaxial cable 110 through the concave portion at the second end.

Figure 6A:
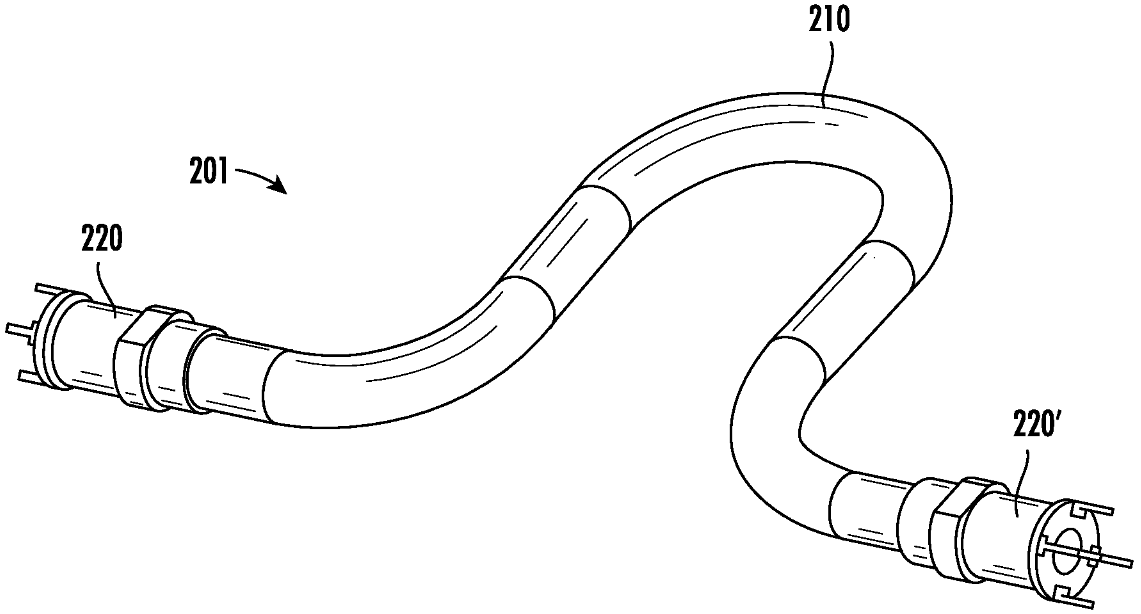
FIGS. 6A, 6B and 6C show a perspective view, a schematic diagram of a use environment, and a partial cross-sectional view of a board-to-board connector according to a third embodiment of the present disclosure.
Figure 6B:
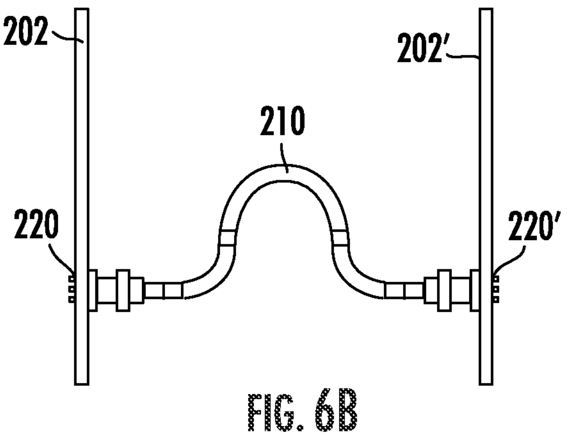
Figure 6C:
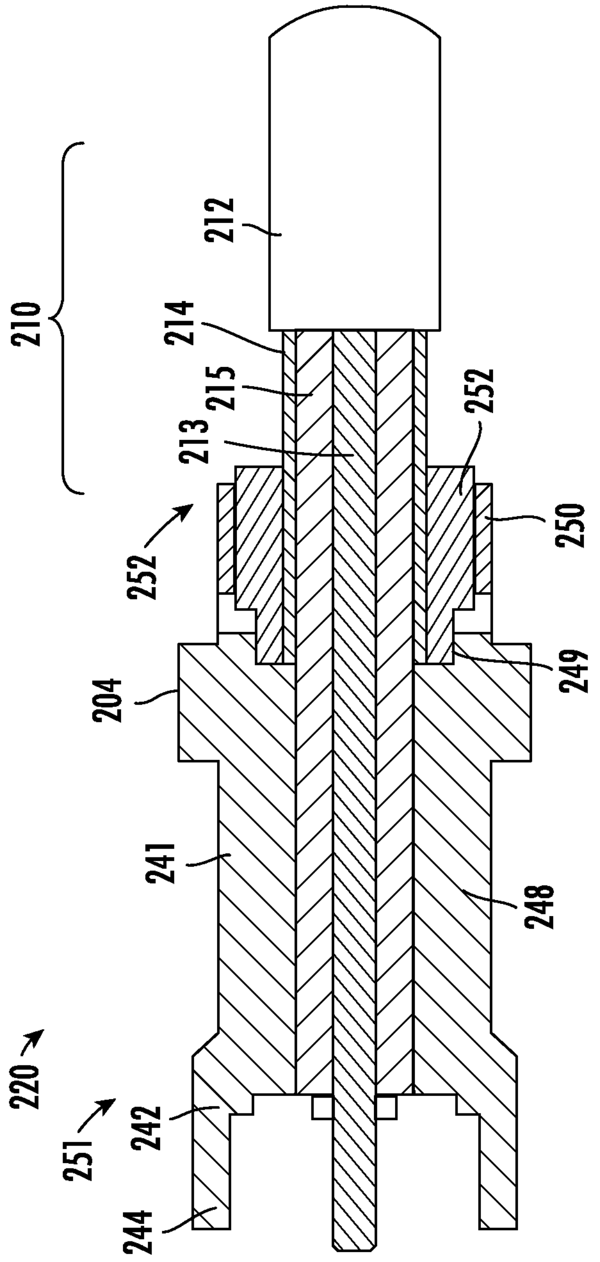

A board-to-board connector 201 according to a third embodiment of the present disclosure will be described below with reference to FIGS. 6A to 6C. The board-to-board connector 201 includes a flexible radio frequency coaxial cable 210, and interfaces 220 and 220' connected to two ends of the radio frequency coaxial cable 210.

The radio frequency coaxial cable 210 includes an inner conductor 213, an insulating layer 215, an outer conductor 214, and a sheath 212 surrounding the outer conductor 214 radially from the inside to the outside. The interface 220 is used to connect one end of the radio frequency coaxial cable 210 to a circuit board 202, and the interface 220' is used to connect the other end of the radio frequency coaxial cable 210 to a circuit board 202'. The inner conductor 213 of the radio frequency coaxial cable 210 is used to transmit electrical signals between the two circuit boards 202 and 202', the outer conductor 214 and the interfaces 220 and 220' together ground the board-to-board connector 201 and shield radio frequency signals, and the insulating layer 215 is used to insulate and separate the conductive inner conductor 213 and the conductive outer conductor 214.

The interface 220 includes a housing 204. The housing 204 includes a main body part 241 and a flange part 242 located at a first end 251 of the main body part 241. The main body part 241 is a substantially elongated hollow cylinder. At least two continuous axial through holes (three shown in the figure, including through holes 248, 249, and 250) are provided in the radial interior of the hollow cylinder, and the diameter of the through hole 248 located near the first end 251 is smaller than the diameter of the through hole 250 located near the second end 252. The through hole 248 located near the first end 251 is used to receive and fix the exposed insulating layer 215 of the radio frequency coaxial cable 210, and has a diameter substantially equal to or slightly greater than the diameter of the insulating layer 215 of the radio frequency coaxial cable 210 but smaller than the diameter of the outer conductor 214 of the radio frequency coaxial cable 210. The through hole 250 located near the second end 252 together with the through hole 249 is used to receive the exposed outer conductor 214 of the radio frequency coaxial cable 210, and has a diameter greater than the diameter of the outer conductor 214 of the radio frequency coaxial cable 210. The housing 204 may be made of any suitable metal material with good electrical conductivity.

The flange part 242 protrudes radially outward from the first end 251 of the main body part 241. The flange part 242 may surround the end of the main body part 241 in a continuous ring shape, or surround the end of the main body part 241 in a plurality of arc shapes spaced apart from one another. In some embodiments, a reinforcing member (for example, a reinforcing rib, etc.) may be provided at the junction between the flange part 242 and the main body part 241 to enhance the stability of the flange part 242.

One or more elongated legs 244 may be evenly or unevenly distributed on an axial outer surface of the flange part 242 in a circumferential direction, and protrude outward in the axial direction. The leg 244 is used to pass through a through hole on the circuit board 202 so as to be fixed to the circuit board 202 by soldering or the like. In some embodiments, the number of legs 244 may be set to 1, 2, 3, 4, 5, or any other suitable number.

In another example, instead of the leg 244, one or more protrusions may be evenly or unevenly distributed on the axial outer surfaces of the flange part 242 in the circumferential direction, and protrude outward in the axial direction. The protrusions do not pass through the through holes on the circuit board 202, but are directly fixed to the circuit board 202 by soldering or the like. In some embodiments, the number of protrusions may be set to 1, 2, 3, 4, 5, or any other suitable number.

During assembly, a certain length of the sheath 212 at one end of the radio frequency coaxial cable 210 is stripped off to expose the outer conductor 214; a certain length of the exposed outer conductor 214 is stripped off to expose the insulating layer 215; and a certain length of the exposed insulating layer 215 is stripped off to expose the inner conductor 213. As a result, the end of the radio frequency coaxial cable 210 is provided with an exposed inner conductor 213 section, an exposed insulating layer 215 section, and an exposed outer conductor 214 section in this sequence from the end. The prepared end of the radio frequency coaxial cable 210 is inserted into the interface interface, and the exposed inner conductor 213 section protrudes out of the main body part 241. The exposed insulating layer 215 section is placed in the through hole 248 of the main body part 241, and the exposed outer conductor 214 section is placed in the through holes 249 and 250 of the main body part 241. The solder 252 is placed in the through holes 249 and 250 and surrounds the outer conductor 214 of the radio frequency coaxial cable 210 so as to solder the outer conductor 214 of the radio frequency coaxial cable 210 to the main body part 241.

The interface 220' is used to connect the other end of the radio frequency coaxial cable 210 to the circuit board 202'. The interface 220' has a structure similar to that of the interface 220, and will not be described again.

The board-to-board connectors 101 and 201 are provided with radio frequency coaxial cables 110 and 210 at the intermediate portion thereof. Depending on the desired applications, these connectors 101 and 201 can be applied to two circuit boards with variable distances, for example, in the range of about 40 mm to about 300 mm.

The flexibility of the cables of the connectors 101 and 201 enable the interfaces on the ends of the cables to connect properly even when the two circuit boards are not perfectly aligned with each other. That is, the cables can absorb the lengthwise and radial offsets between the two circuit boards. For example, the cables can absorb the lengthwise offset of +/−7 mm, and particularly the lengthwise offset of +/−5 mm between the two circuit boards. The cables can absorb the radial offset of +/−7 degree, and particularly the radial offset of +/−5 degree between the two circuit boards.

The board-to-board connector according to the embodiments of the present disclosure has a simple structure and low cost.

The board-to-board connector according to the embodiments of the present disclosure can achieve satisfactory PIM performance.

Although the exemplary embodiments of the present disclosure have been described, it should be understood by those skilled in the art that a plurality of variations and changes can be created and made to the exemplary embodiments of the present disclosure without essentially departing from the spirit and scope of the present disclosure. Therefore, all variations and changes are included in the protection scope of the present disclosure defined by the claims. The present disclosure is defined by the attached claims, and equivalents of these claims are also included.

The invention claimed is:

1. An internal printed circuit board-to-printed circuit board connector for a wireless communication base station, wherein the internal printed circuit board-to-printed circuit board connector is configured to connect a first circuit board and a second circuit board spaced apart together, the internal printed circuit board-to-printed circuit board connector includes:

a radio frequency coaxial cable; and a first interface and a second interface respectively connected to two opposing ends of the radio frequency coaxial cable, wherein each of the first interface and the second interface includes a housing, the housing includes a hollow main body part and a flange part located at a first end of the main body part, the main body part receives one end of the radio frequency coaxial cable at a second end opposite to the first end, the flange part is provided with one or more protruding portions, a protruding portion of the first interface is configured to connect the first interface to the first circuit board, and a protruding portion of the second interface is configured to connect the second interface to the second circuit board.

2. The internal printed circuit board-to-printed circuit board connector according to claim 1, wherein each of the two opposing ends of the radio frequency coaxial cable is provided with an exposed inner conductor section, an exposed insulating layer section, and an exposed outer conductor section in this sequence from the end, or is provided with an exposed inner conductor section and an exposed outer conductor section in this sequence from the end.

3. The internal printed circuit board-to-printed circuit board connector according to claim 2, wherein at least two continuous axial through holes are provided in the hollow interior of the main body part of the housing, the at least two continuous axial holes include a first axial through hole close to the first end of the main body part and a second axial through hole close to the second end of the main body part, and the first axial through hole has a diameter smaller than that of the second axial through hole.

4. The internal printed circuit board-to-printed circuit board connector according to claim 3, wherein the second axial through hole is configured to receive the exposed outer conductor section of the radio frequency coaxial cable, and has a diameter greater than the diameter of the exposed outer conductor section of the radio frequency coaxial cable.

5. The internal printed circuit board-to-printed circuit board connector according to claim 4, wherein the second axial through hole is configured to receive solder around the exposed outer conductor section of the radio frequency coaxial cable so as to solder the exposed outer conductor section of the radio frequency coaxial cable to the main body part.

6. The internal printed circuit board-to-printed circuit board connector according to claim 1, wherein the flange part protrudes radially outward from the first end of the main body part.

7. The internal printed circuit board-to-printed circuit board connector according to claim 1, wherein the flange part surrounds the first end of the main body part in a continuous ring shape, or surrounds the first end of the main body part in a plurality of arc shapes spaced apart from one another.

8. The internal printed circuit board-to-printed circuit board connector according to claim 1, wherein the one or more protruding portions include an elongated leg protruding outward in an axial direction from an axial outer surface of the flange part.

9. The internal printed circuit board-to-printed circuit board connector according to claim 8, wherein the leg is configured to pass through the through hole on the first circuit board or the second circuit board so as to be fixed to the corresponding circuit board by soldering.

10. The internal printed circuit board-to-printed circuit board connector according to claim 1, wherein the one or more protruding portions include a protrusion protruding outward in the axial direction from the axial outer surface of the flange part.

11. The internal printed circuit board-to-printed circuit board connector according to claim 10, wherein the protrusion is configured to be fixed to the first circuit board or the second circuit board by soldering.

12. The internal printed circuit board-to-printed circuit board connector according to claim 1, wherein the main body part is a substantially elongated hollow cylinder.

13. The internal printed circuit board-to-printed circuit board connector according to claim 3, wherein the first axial through hole is configured to fix the exposed insulating layer section of the radio frequency coaxial cable, and has a diameter equal to or slightly greater than the diameter of the exposed insulating layer section of the radio frequency coaxial cable and smaller than the diameter of the exposed outer conductor section of the radio frequency coaxial cable.

14. The board-to-board connector according to claim 13, wherein the exposed inner conductor section of the radio frequency coaxial cable protrudes to the outside of the hollow interior of the main body part until it is substantially flush with the protruding portion or exceeds the protruding portion in the axial direction.

15. The internal printed circuit board-to-printed circuit board connector according to claim 3, wherein the interface further includes an inner contact portion provided in the hollow interior of the main body part, a first end of the inner contact portion protrudes out of the first end of the inner interior of the main body part until it is substantially flush with the protruding portion or exceeds the protruding portion in the axial direction, and an opposite second end of the inner contact portion is provided with a concave portion for receiving the exposed inner conductor section of the radio frequency coaxial cable.

16. The internal printed circuit board-to-printed circuit board connector according to claim 15, wherein the inner contact portion is substantially provided on a central axis of the housing.

17. The internal printed circuit board-to-printed circuit board connector according to claim 15, wherein the inner contact portion and the housing are spaced apart and are insulated by air.

18. The internal printed circuit board-to-printed circuit board connector according to claim 15, wherein the interface further includes an insulating layer, and the insulating layer of the interface surrounds and fixes the inner contact portion and is provided between the inner contact portion and the housing.

19. The internal printed circuit board-to-printed circuit board connector according to claim 18, wherein the first axial through hole is configured to fix the insulating layer of the interface, and the diameter of the first axial through hole is smaller than the diameter of the exposed outer conductor section of the radio frequency coaxial cable.

* * * * *